US007412805B2

(12) United States Patent
Parrish

(10) Patent No.: US 7,412,805 B2
(45) Date of Patent: Aug. 19, 2008

(54) MODULAR BUILDINGS AND MATERIALS USED IN THEIR CONSTRUCTION

(75) Inventor: Malcolm Parrish, Norwich (GB)

(73) Assignee: Abersham Technologies Limited (GB)

( * ) Notice: Subject to any disclaimer, the term of this patent is extended or adjusted under 35 U.S.C. 154(b) by 0 days.

(21) Appl. No.: 10/258,194

(22) PCT Filed: Apr. 18, 2001

(86) PCT No.: PCT/GB01/01750

§ 371 (c)(1),
(2), (4) Date: May 9, 2003

(87) PCT Pub. No.: WO01/79619

PCT Pub. Date: Oct. 25, 2001

(65) Prior Publication Data

US 2003/0182886 A1  Oct. 2, 2003

(30) Foreign Application Priority Data

Apr. 18, 2000  (GB) ................. 0009521.6

(51) Int. Cl.
*E04B 1/62* (2006.01)
*E04F 15/14* (2006.01)
*E04F 15/22* (2006.01)

(52) U.S. Cl. ............. 52/293.3; 52/295; 52/223.13; 52/23; 52/585.1

(58) Field of Classification Search ........... 52/293.3, 52/295, 223.13, 92.1, 582.1, 23, 585.1, 605, 52/236.6, 223.7, 223.1, DIG. 11; 442/149, 442/180, 136
See application file for complete search history.

(56) References Cited

U.S. PATENT DOCUMENTS

| 1,479,557 | A | * | 1/1924 | Raymond | ............ 52/91.1 |
| 4,147,009 | A | * | 4/1979 | Watry | ............ 52/742.15 |
| 4,294,051 | A | * | 10/1981 | Hughes, Jr. | ............ 52/98 |
| 4,306,395 | A | * | 12/1981 | Carpenter | ............ 52/223.6 |
| 4,310,587 | A | * | 1/1982 | Beaupre | ............ 442/31 |

(Continued)

FOREIGN PATENT DOCUMENTS

WO  WO 97/32094  9/1997

(Continued)

OTHER PUBLICATIONS

John McCollam, Arizona Concrete, Nov. 20, 1996.*

*Primary Examiner*—Richard E. Chilcot, Jr.
*Assistant Examiner*—Chi Q Nguyen
(74) *Attorney, Agent, or Firm*—Factor & Lake

(57) ABSTRACT

A modular building comprising: a foundation floor having secured therein a plurality of anchor elements; a plurality of wall-retaining track elements adapted to engage wall panels of the building, the track elements being securable to the foundation floor so as to define the position of at least the load bearing walls of the building; wall panels locatable with respect to the track elements, each panel including at least one channel or duct formed therein parallel to a longitudinal axis thereof and at least one channel or duct formed therein disposed perpendicularly to and laterally of the longitudinal axis; and a plurality of securing members adapted to pass through and locatable within said channels or ducts, the securing members being anchored at each end thereof so as to maintain the panels in fixed relationship to one another.

19 Claims, 10 Drawing Sheets

U.S. PATENT DOCUMENTS

| | | | |
|---|---|---|---|
| 4,416,098 A * | 11/1983 | Goidinger | 52/309.16 |
| 4,428,174 A * | 1/1984 | Grady, II | 52/745.13 |
| 4,441,944 A * | 4/1984 | Massey | 156/71 |
| 4,903,446 A * | 2/1990 | Richards et al. | 52/223.6 |
| 5,531,054 A * | 7/1996 | Ramirez | 52/741.1 |
| 5,623,788 A * | 4/1997 | Bimberg et al. | 52/23 |
| 5,678,373 A * | 10/1997 | Franklin et al. | 52/439 |
| 5,697,189 A * | 12/1997 | Miller et al. | 52/79.9 |
| 5,743,056 A * | 4/1998 | Balla-Goddard et al. | 52/309.11 |
| 5,763,042 A * | 6/1998 | Kaiser et al. | 428/108 |
| 5,763,735 A * | 6/1998 | Stahl | 588/16 |
| 5,791,090 A * | 8/1998 | Gitlin et al. | 52/4 |
| 5,890,332 A * | 4/1999 | Skidmore et al. | 52/271 |
| 5,924,254 A * | 7/1999 | Franklin et al. | 52/439 |
| 5,948,708 A * | 9/1999 | Langley | 442/131 |
| 6,085,476 A * | 7/2000 | Jantzi et al. | 52/223.7 |
| 6,098,357 A * | 8/2000 | Franklin et al. | 52/223.7 |
| 6,119,417 A * | 9/2000 | Valverde et al. | 52/223.7 |
| 6,256,960 B1 * | 7/2001 | Babcock et al. | 52/592.1 |
| 6,315,865 B1 * | 11/2001 | Allen et al. | 162/145 |
| 6,412,243 B1 * | 7/2002 | Sutelan | 52/309.7 |
| 6,444,162 B1 * | 9/2002 | Anshits et al. | 264/628 |
| 6,490,828 B1 * | 12/2002 | Fuller et al. | 52/36.1 |
| 6,500,520 B1 * | 12/2002 | Wiercinski et al. | 428/150 |
| 6,557,316 B2 * | 5/2003 | Van Der Heijden | 52/585.1 |
| 6,564,524 B1 * | 5/2003 | Gruita | 52/604 |
| 6,670,291 B1 * | 12/2003 | Tompkins et al. | 442/136 |
| 2003/0089061 A1 * | 5/2003 | DeFord et al. | 52/309.9 |
| 2003/0170445 A1 * | 9/2003 | Parrish | 428/323 |
| 2003/0182886 A1 * | 10/2003 | Parrish | 52/293.3 |
| 2004/0038065 A1 * | 2/2004 | Francis et al. | 428/537.7 |

FOREIGN PATENT DOCUMENTS

WO     WO 99/57387     11/1999

* cited by examiner

MODULAR BUILDINGS AND MATERIALS USED IN THEIR CONSTRUCTION

FIELD OF THE INVENTION

The present invention relates to improved modular buildings and to methods of constructing modular buildings, particularly those which are suited to withstand earthquakes and high winds.

Additionally, the invention relates to structural elements for use in the construction of modular buildings and particularly to panels and wall sections for such buildings. The invention further relates to materials for use in the construction of the buildings.

BACKGROUND TO THE INVENTION

The humanitarian and economic impact of natural disasters such as earthquakes and extreme adverse weather conditions such as high winds is becoming of increasing concern to many nations, the recent devastation in Central America being a particular example. Apart from the damage caused to structures, such as bridges and buildings being extremely expensive to repair, the danger to human life brought about by the collapse of such structures means that stronger materials and better methods of construction are increasingly being used.

Unfortunately, however, many of the areas frequently affected by natural disasters are often poor and the costs of materials and improved construction is usually prohibitive. Furthermore, the quantity of raw materials necessary to produce the volume of housing required, could cause a negative impact on the environment, firstly due to the depletion of the raw materials and secondly due to the method of production of the final material which method can be energy intensive. Moreover, a primary consideration following a large scale disaster is that any new buildings erected, should be erected as rapidly as possible. Again, with conventional materials of construction this is not usually done as rapidly as desired, which increases the misery and suffering of the victims. It is also worthy of consideration that, following a large disaster, there will most likely be insufficient skilled labour available to carry out the construction required. There is therefore a need for the rapid deployment of the means to facilitate the construction of buildings which can be constructed using predominantly unskilled labour.

A further and more general problem when constructing a large number of buildings is the provision, at the construction site of the elements needed to carry out the building work. This includes, typically, not just brick, steel, sand or wood for example, but also the means for producing concrete, mortar and correctly forming walls, window frames to the correct size. Such preparation of materials requires a great deal of time which is not always desirable either from an economic or a humanitarian standpoint. Furthermore, commonly used materials, particularly steel and wood are prone to degradation such as rusting or rot. Wood also can be subject to insect and mould attack which reduces its mechanical strength.

It is therefore desirable to develop new materials from which the constructional elements of a house such as the walls and roof can be made. Such new materials must be durable and also able to withstand extremes of wind and temperature.

It is an object of the present invention to provide low cost and easily constructable modular housing which is capable of withstanding extreme weather conditions or even earthquakes.

It is a further object of the invention to utilise available materials to provide composite materials for use in the construction of modular housing which can be produced at minimal impact to the environment.

It is a yet further object of the invention to provide constructional elements which can be rapidly formed and deployed when constructing a building.

SUMMARY OF THE INVENTION

According to a first aspect of the present invention there is provided a modular building comprising:
  a foundation floor having secured therein a plurality of anchor elements;
  a plurality of wall-retaining track elements adapted to engage wall panels of the building, the track elements being securable to the foundation floor so as to define the position of at least the load bearing walls of the building;
  wall panels locatable with respect to the track elements, each panel including at least one channel or duct formed therein parallel to a longitudinal axis thereof and at least one channel or duct formed therein disposed perpendicularly to and laterally of the longitudinal axis; and
  a plurality of securing members adapted to pass through and locatable within said channels or ducts, the securing members being anchored at each end thereof so as to maintain the panels in fixed relationship to one another.

The building further comprises a roof structure formed from a plurality of roof panels, each panel including at least one channel or duct formed therein parallel to the longitudinal axis thereof and at least one channel or duct formed therein disposed perpendicularly to and laterally of the longitudinal axis.

The roof panels are secured to a roof beam utilising a plurality of securing members which are adapted to pass through and be locatable within said channels or ducts, the securing members being anchored at each end thereof so as to secure the panels in fixed relationship to one another and the roof beam.

Advantageously, the security members comprise rods or cables having high tensile strength characteristics while maintaining flexibility.

In one arrangement the securing members include a threaded sleeve element at one or both ends thereof for receiving a securing bolt. The securing members comprise glass-fibre strands bonded together with the strands in parallel alignment. Additionally, the securing members are coated with a plastics material such as polypropylene to increase abrasion resistance.

The securing members are positioned and tensioned so as to form a net-like structure to resist panel movement.

The wall-retaining members are conveniently bondable to the foundation floor by means of a mastic sealant. The or each tracking member may additionally be secured by means of one or more connection bolts.

The wall panels advantageously comprise grooves to receive the securing members. The wall panels may additionally comprise one or more ducts or channels to receive electric wires or a plumbing system. The wall panels may additionally comprise apertures to receive floor and window cartridge units. A sealant may be provided between adjacent wall panels to give increased strength and water resistance.

A building as so formed is highly wind resistant, and the materials from which it is formed are resistant to for example heat, rain, mildew and insects.

According to another aspect of the invention there is provided a construction element such as a wall or roof panel for a modular building, the construction element comprising a composite material utilising silica cenospheres and a resin. The wall or roof panels have bonded to and across at least part of its surface, a second composite material, the second composite material comprising a number of layers; including a first inner nylon layer and a second outer nylon layer, a glass fibre mat layer between the first and second nylon layers; and a polymer resin distributed between the nylon layers to bond the nylon layers together.

The thickness of the nylon layers is preferably between 17-21 μm, so that the nylon layers neither tears too easily during processing nor distorts during processing. A value of 19 μm has been found to be particularly preferable.

The resin is preferably present at a level of 30-50% w/w of the second composite material and particularly preferably at a level of 20% w/w. The resin can be selected from one or more of the following classes of polymeric compounds, polyester, polyurethane, polyacrylic, polyphenolic, polybromophenolic, polyvinylester or an epoxy resin, or mixtures thereof.

A fire retardant material is preferably included between the nylon layers. The fire retardant material is preferably aluminium trioxide which can absorb heat well, and disperse the path of a flame or heat through the second composite material. The aluminium trioxide is advantageously present at a level of 15-50% w/w with respect to the resin. The level is preferably from 30-40% w/w, and particularly preferably approximately 35% w/w. Optionally, the fire retardant material can comprise glass flakes. In a further alternative, a fire retardant chemical such as polyhalogenated phenols, for example bromophenols can be included.

The second composite material advantageously includes a glass-tissue layer having a density of 14-30 g/m$^2$, to reduce uneven features being introduced to the surface of the second composite material.

The second composite material includes a colouring agent such as titanium dioxide to improve its appearance. The surface of the second composite material can be altered by means of an electric current passed across the surface, the surface structure then being enabled to receive, for example, paint or varnish.

There is also provided a method of constructing a building comprising the steps of:
 preparing a ground area on which the building is to stand to receive a foundation floor;
 forming a foundation floor having secured therein a plurality of anchor elements;
 securing wall-retaining members to the foundation floor over said anchor elements, to define the location of load bearing walls,
 attaching elongate security members to the anchor elements;
 locating wall panels, having one or more security member receiving channels, with respect to the wall-retaining members;
 securing wall panels by threading the flexible securing members through the wall panels;
 tensioning said securing members; and
 locking the securing members to attenuate movement.

Advantageously the method further comprises the step of disposing mastic sealant between the wall-retaining members and the foundation floor.

BRIEF DESCRIPTION OF THE DRAWINGS

The invention will now be described more particularly with reference to the accompanying drawings which show, by way of example only, one embodiment of modular building according to the invention. In the drawings.

DETAILED DESCRIPTION OF THE INVENTION

Figure 1:
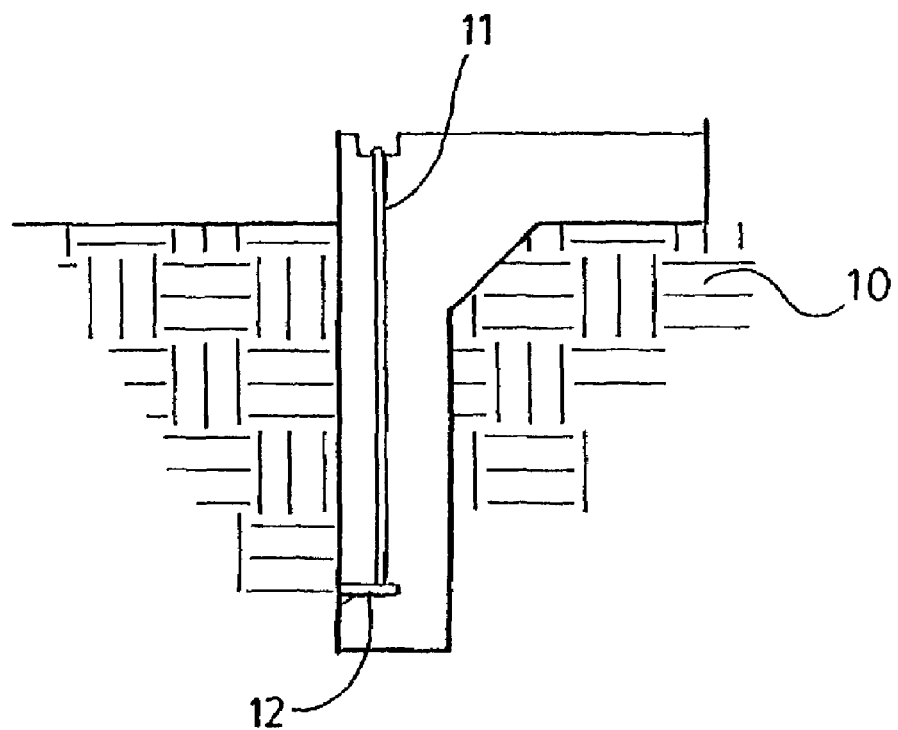
FIG. 1 is a detailed cross-sectional side elevation through a foundation floor.

Referring initially to FIG. 1, the concrete foundation slab 10, has secured therein a vertical rod 11 to provide an anchor for securing cables. The vertical rod 11 is attached at a lower end to a ground anchor 12.

Figure 2:
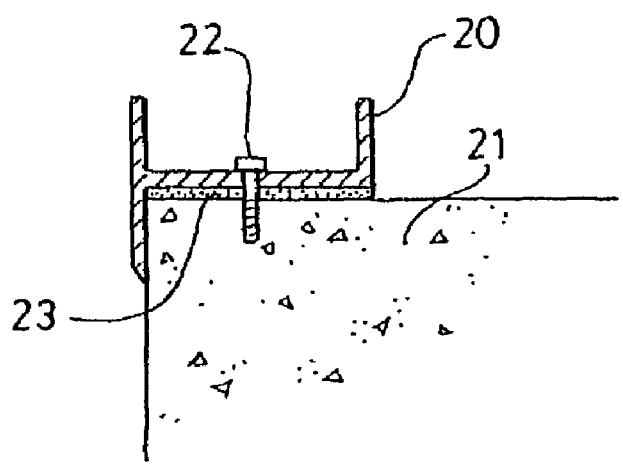
FIG. 2 is a cross-sectional side elevation through a foundation floor to which there is secured a wall-retaining member.
Figure 3:
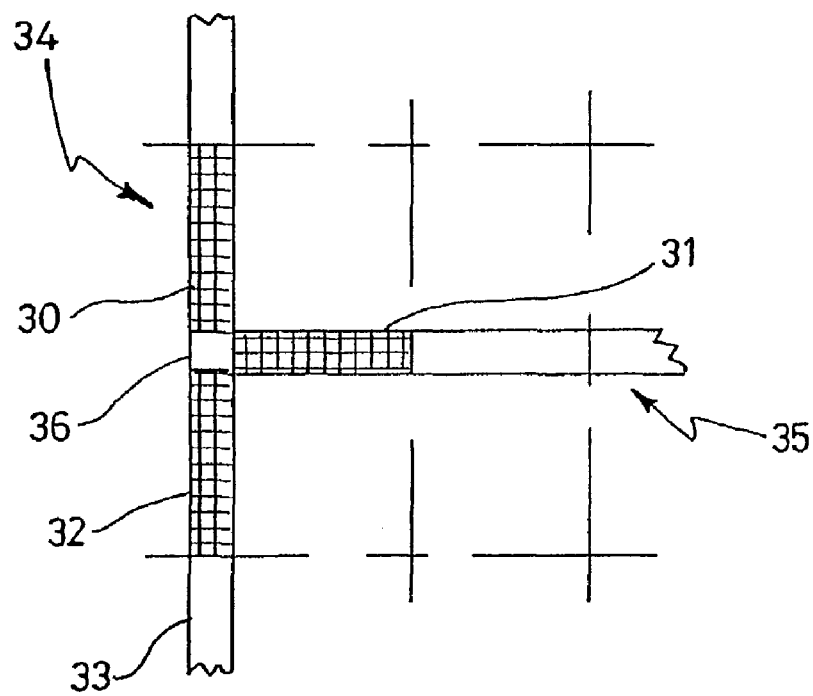
FIG. 3 is a schematic top plan view of three panels joined to form a wall.
Figure 4:
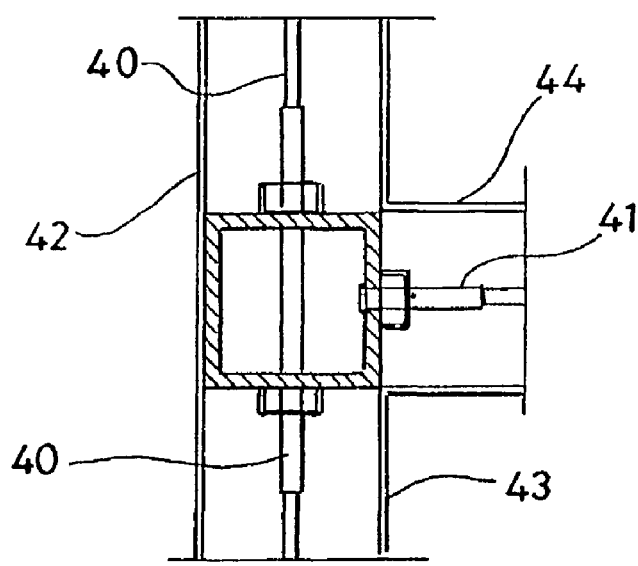
FIG. 4 is a detailed section top plan view of the panel junction shown in FIG. 3.
Figure 5:
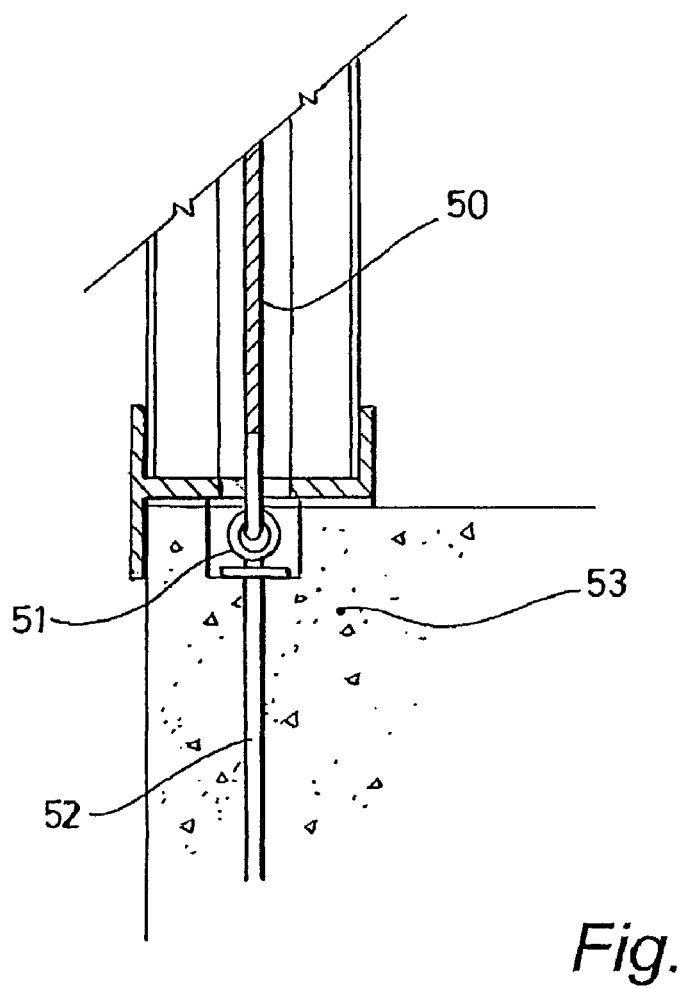
FIG. 5 is a vertical section taken through a wall panel sitting in a wall-retaining member and secured to the foundation floor by a cable.

FIG. 2 shows a wall retaining member 20, secured to a foundation slab 21 by a connection bolt 22. A layer of mastic 23 forms a waterproof sealant between the wall retaining member 20 and the foundation slab 21. FIG. 3 shows the wall panels 30, 31, 32 fixed in position on the wall retaining member 33 to form part of an outer wall 34 and an internal wall 35. The panels abut a box beam 36. In FIG. 4, the horizontal cables 40, 41 can be seen in more detail. In use, these cables anchor the wall panels 42, 43, 44 in position. Vertical cables 50 are held in position at the anchor point 51. The anchor point 51 is attached to the vertical rod 52 which is set into the concrete of the foundation slab 53 as shown in FIG. 5.

Figure 6:
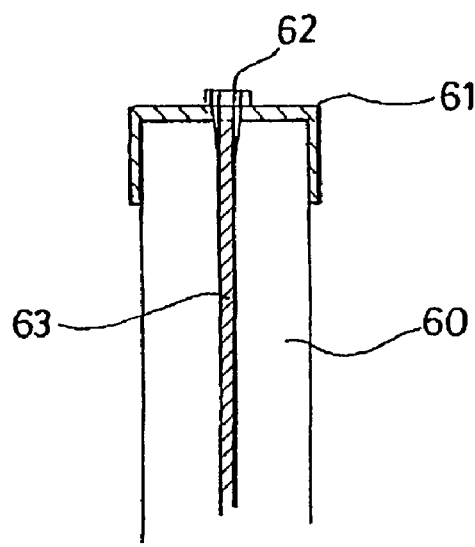
FIG. 6 is a vertical section taken through a top wall-retainer and wall panel.
Figure 7:
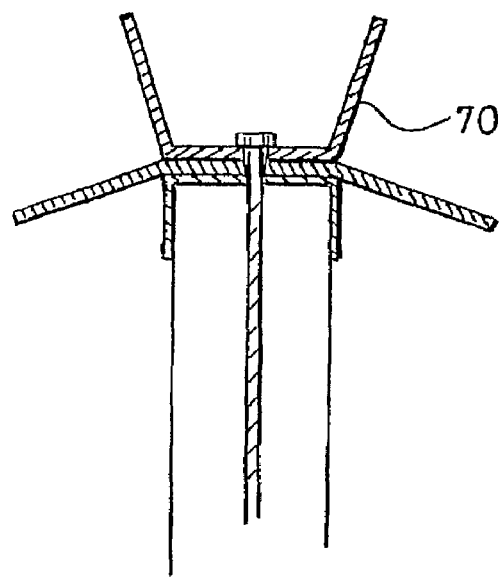
FIG. 7 shows a vertical section taken through a central wall panel and connected to a ridge beam.

FIG. 6 shows the top of the wall panel 60 with a top wall track 61 fixed into position. The top wall track 61 is fixed into position by means of a connecting bolt 62 secured and tensioned by a vertical flexible fibre cable 63. Where the wall panel is to be part of the central wall of the building, an additional ridge beam 70 may also be secured into position as shown in FIG. 7.

Figure 8:
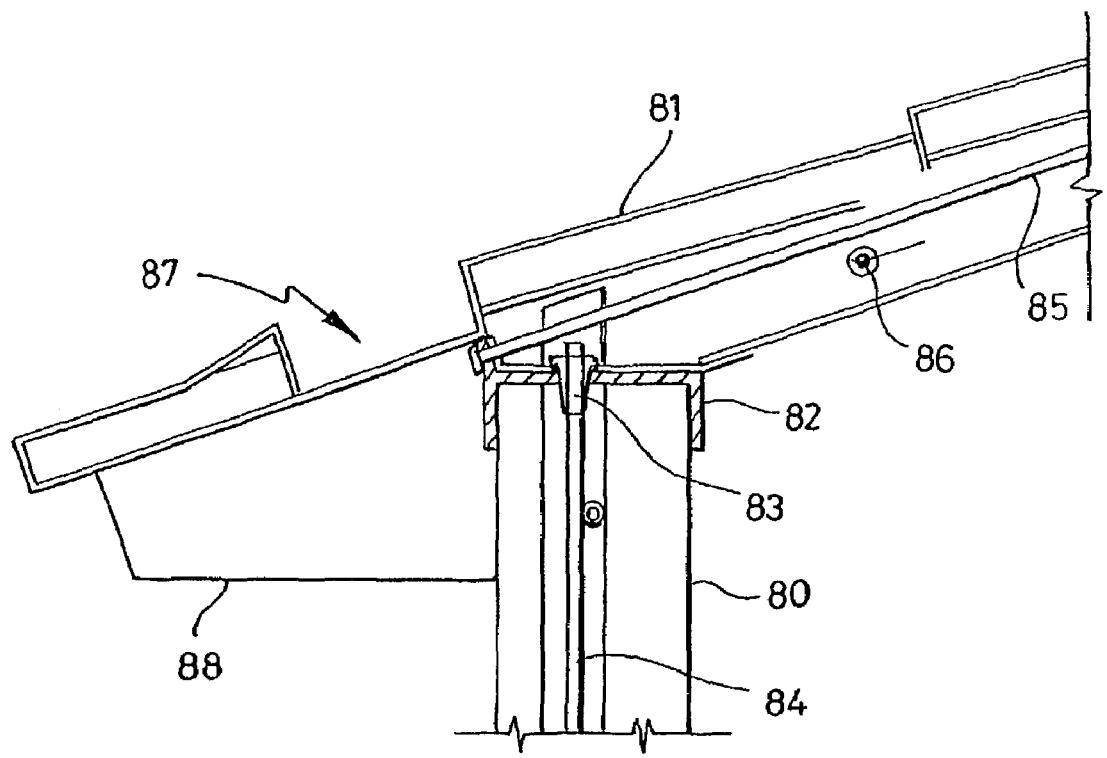
FIG. 8 shows a vertical section taken through an outside wall and connected to a roof panel.

FIG. 8 illustrates a joint between a wall panel 80 and a roof panel 81. A top wall track 82 is fitted to the top of the wall panel 80, and secured in position by a connection bolt 83, attached to securing cable 84. The roof panel 81 is secured by means of a horizontal fibre cable 85, and further horizontal cables 86.

The roof panel 81 incorporates a built-in gutter 87 which is connected to a piping system leading to a storage tank (not illustrated). The rain-water collected by this gutter and piping system can be employed for non-potable uses such as watering crops. Once the roof panel 81 and piping system is in place, a soffit panel 88 and fascia panels may be positioned in place.

Figure 9:
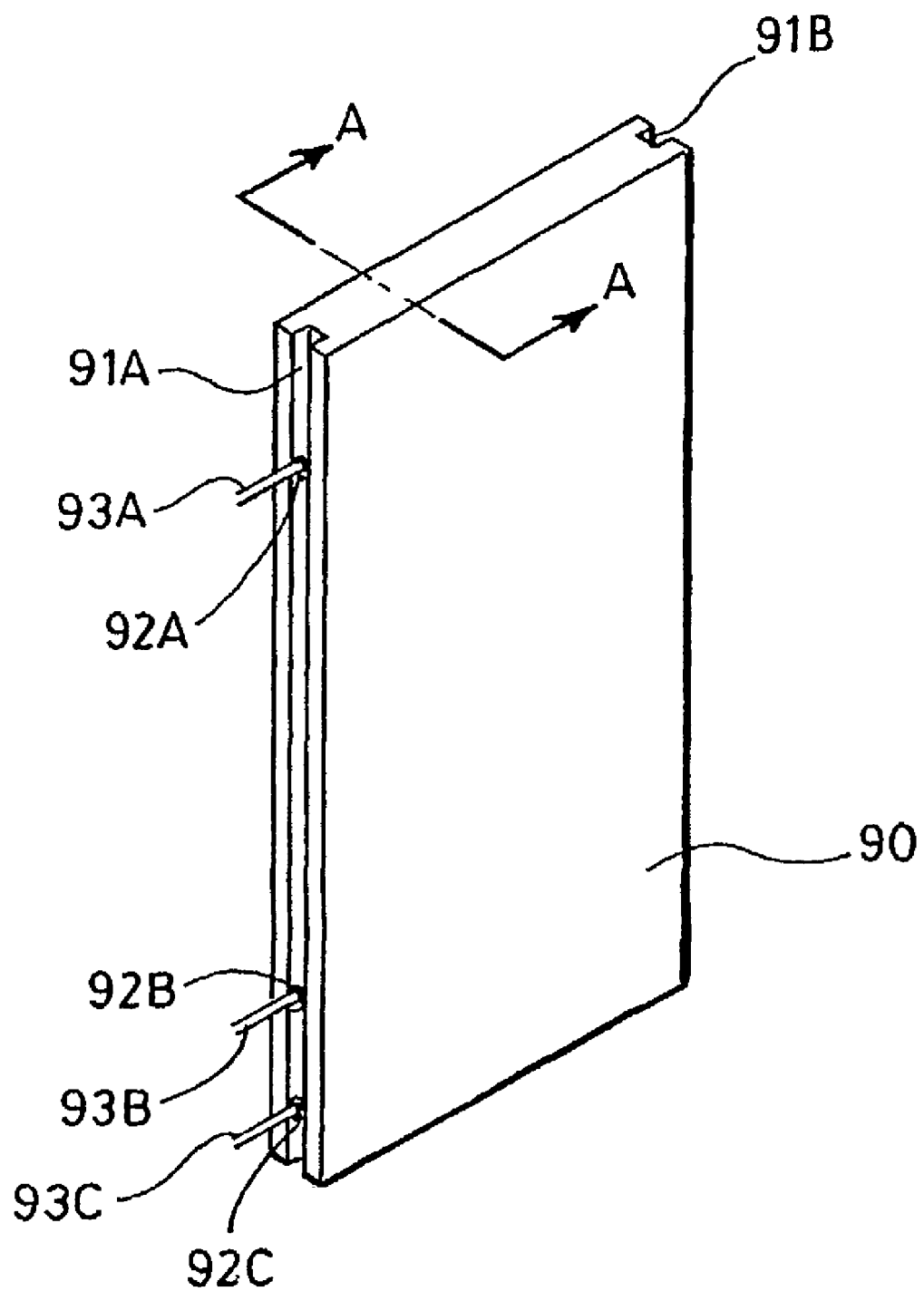
FIG. 9 is a perspective view of a wall panel.

A wall panel 90, suitable for use in assembling the above buildings as shown in FIG. 9. The wall panel 90 is generally rectangular cuboidal in shape. It comprises grooves 91A, 91B which in use receive vertical fibre cables. The wall panel 90 also comprises apertures 92A, 92B, 92C leading into internal panels across the width of the wall panel to receive horizontal securing cables 93A, 93B, 93C.

Figure 10:
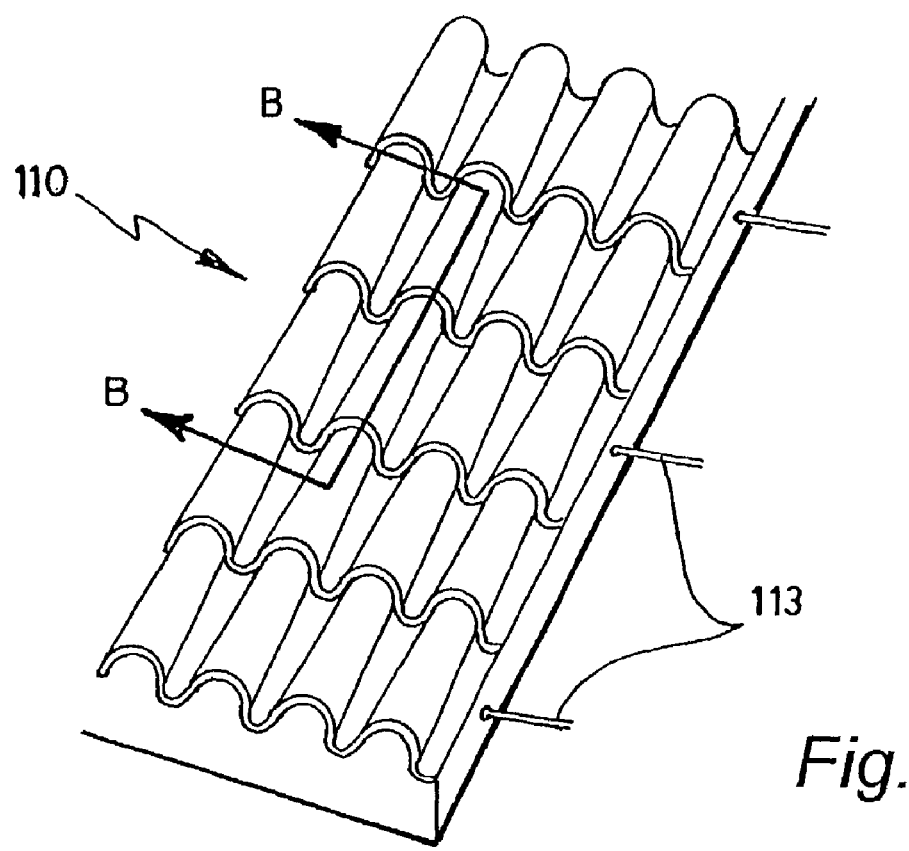
FIG. 10 is a perspective view of a roof panel with a tile effect outer surface.
Figure 11:
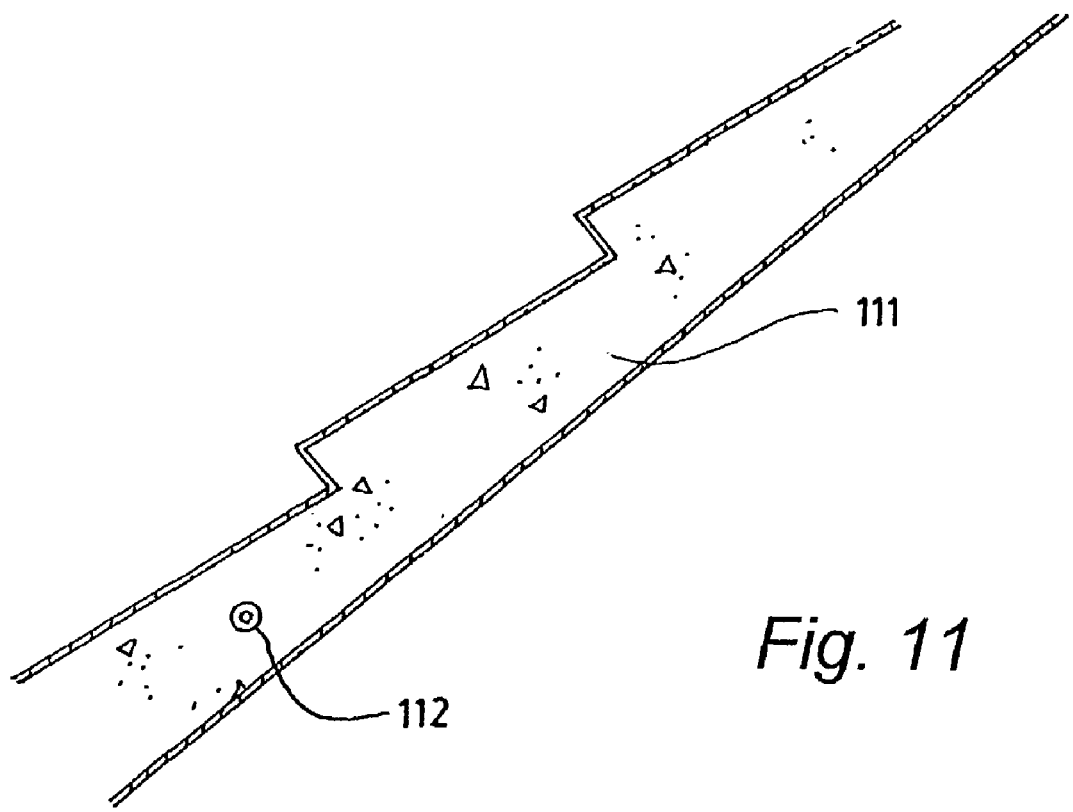
FIG. 11 is a sectional side elevation taken through a roof panel along B-B of FIG. 10.
Figure 12:
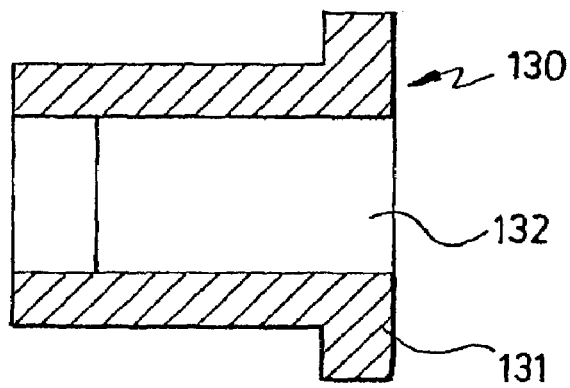
FIG. 12 is a section through a bobbin.
Figure 13:
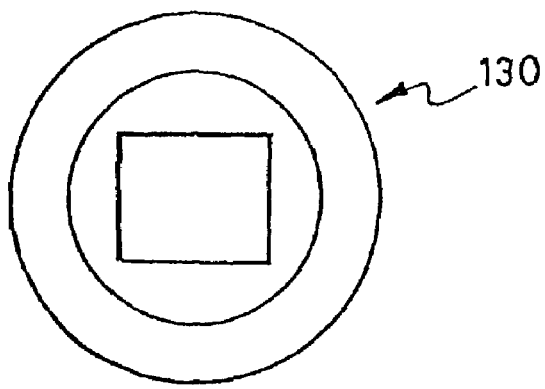
FIG. 13 is front elevation of a bobbin.
Figure 14:
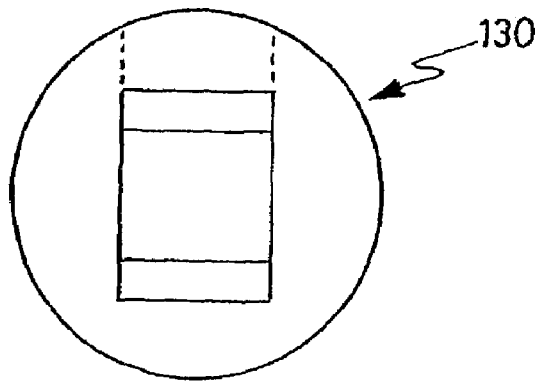
FIG. 14 is a rear elevation of a bobbin.
Figure 15:
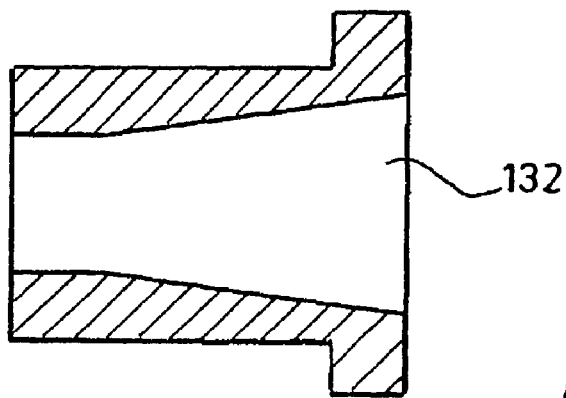
FIG. 15 is a sectional elevation of a bobbin, the section being at right angles to that shown in FIG. 12.

FIGS. 10 and 11 show a roof panel 110 having a tile-effect outer surface. The roof panel 110 comprises an inner core 111 formed from the same composite material as is used for the wall panel 90. The roof panel 110 comprises a number of channels 112 within the inner core 111 to receive horizontal securing cables 113.

FIGS. 12-15 show a bobbin 130 used to secure the flexible cables in position. The bobbin 130 comprises an outer wall 131 defining a cable-receiving cavity 132. One end of the cable-receiving cavity 132 is tapered. The angle of taper with respect to the longitudinal axis of the bobbin 130 being 15 degrees.

Figure 16:
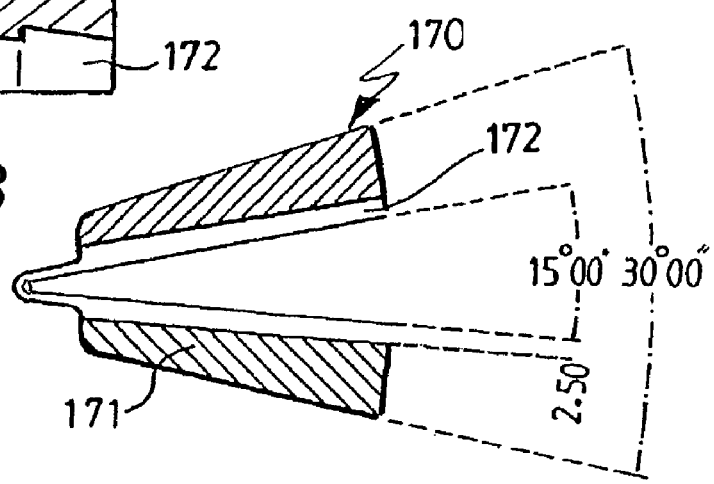
FIG. 16 is a section through a collet.

FIG. 16 shows a collet 170, which in use fits within the tapered portion of the cavity 132. The collet 170 has an outer sheath 171 surrounding an inner core 172. The inner core 172 has a substantially V-shaped cross-section. The outer surface of the inner core 172 has a stepped configuration enabling it to grip the outer sheath 171. The angle subtended by the inner walls of the inner core 172 is 15°. The angle subtended by the walls of the outer sheath 171 is 30°.

Figure 18:
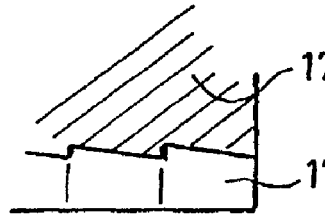
FIG. 18 is an expanded sectional view of part of a collet shown in FIG. 16.
Figure 18A:
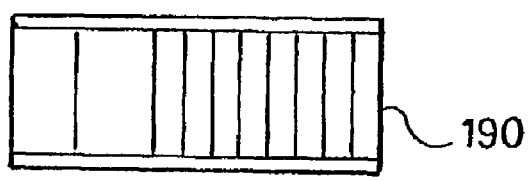
FIG. 18a shows a part of the collet shown in FIG. 16.
Figure 19:
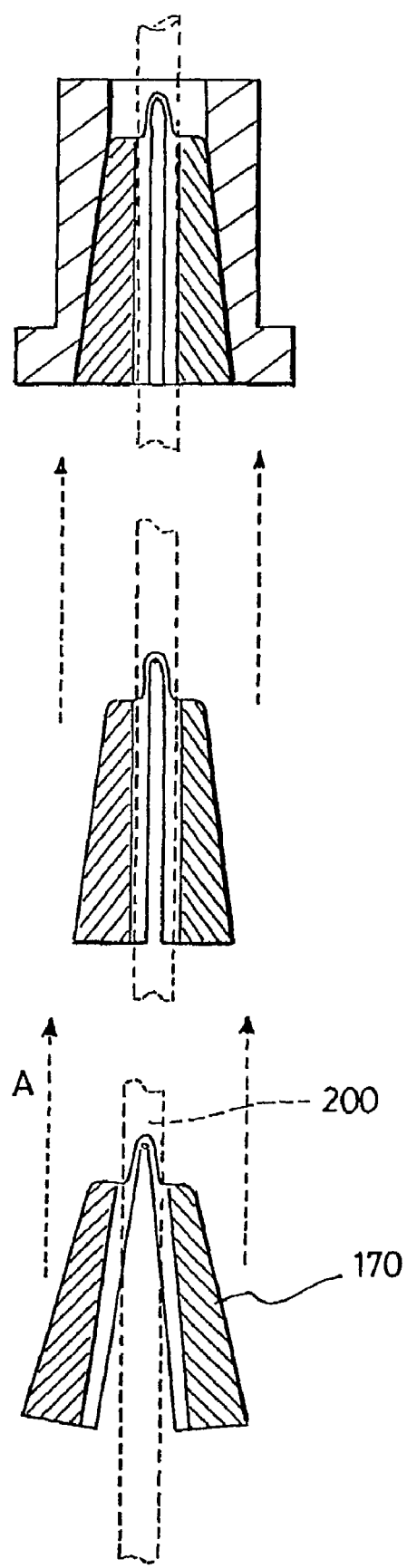
FIG. 19 illustrates the entry of a collet into a bobbin when securing a cable.

The inner surface of the collet 170, as shown in FIGS. 18 and 18a also has a stepped configuration to enable it to grip the securing cables. FIG. 19 illustrates the interaction between the collet 170 and the cable 200, as the collet 170 is moved in the direction shown by arrow A. As the collet 170 is inserted in to the bobbin 130 the collet portions are squeezed together to grip the cable 200.

In use, once the collet and bobbin are in position around the cable, the bobbin 130 is twisted which causes the cable to be gripped more tightly thus securing the cables and retaining the wall or roof panels in position. When used in this manner collet and bobbin act as a connecting bolt.

When constructing a building as described above, the ground is first prepared to a suitable state to receive the building. A concrete foundation slab is formed by pouring into place a cementatious material. Vertical rods which have been placed in the concrete at distances of approximately 1.3 m from one another along the eventual position of the perimeter and centre wall provide connections at the bottom for the connection to ground anchors, and at the top of the finished concrete foundation slab for connection to the vertical flexible fibre cable system.

Wall-retaining members having a U-shaped cross-section for the perimeter and centre walls are positioned onto the foundation slab. A bed of mastic sealant is added between the wall retaining member and the foundation slab in order to improve the water proofing properties and a connection bolt used to secure the wall-retaining members to the floor slab. At the intersection of the rear and centre walls, wall panels are set in place in a T-configuration. A vertical box beam is attached at the centre of the T-junction and horizontal flexible fibre cables are threaded through the wall panels. As each wall panel is put into place a vertical flexible fibre cable is connected at the floor and threaded through an alignment tube pushed into a vertical grove in the edge of the wall panel. The alignment tube has dimensions of approximately 5 cm by 5 cm.

The horizontal flexible fibre cables are tensioned and locked using a cable clamp, thus holding each wall panel precisely in position. The procedure is continued until all the wall panels including any door frames and window wall panels are in place and tensioned.

When all the wall panels are in position, a top wall-retainer is put on top of each wall. Additionally, a ridge beam is placed on top of the centre wall. The vertical flexible fibre cables are then tensioned and locked using a cable clamp. The structure is ready to receive roof panels.

Starting from one end of the building a first roof panel is set onto the wall and ridge beam. Horizontal flexible fibre cables are threaded through the roof panel and attached in position. A spacer tube is placed into the grooved edge of the roof panel and a sealant applied. The next roof panel is slid into place and the flexible fibre cables tensioned and locked. Any excess sealant is squeezed out between the joint between the two roof panels and can be simply removed. The sealant is normally the same colour as the panel to give an impression of there being no joints present. The roof panels are subsequently anchored to the foundation slab and to the ground anchors.

Door and window cartridge units are then snapped into position in the appropriate apertures within the wall and wall panels and secured.

As described, the building is easy to construct as many of the individual elements are pre-formed and need only to be fitted together. The building is also structurally reinforced with a comprehensive network of cables throughout the entire structure which are anchored to the ground through a concrete slab foundation. In this manner the buildings are able to withstand even hurricane force winds. In addition, the construction and materials from which the wall panels are formed mean that the building as a whole has superior thermal and sound insulation. In addition it is also resistant to mildew and insect damage, as well as being extremely fire resistant. Furthermore the building does not require a great deal of maintenance and is durable and long lasting.

The glass beads from which the core material for the wall panels is made can be formed from recycled glass thus reducing the environmental load of materials used in the construction of the building.

In a further embodiment, not illustrated, the ground anchors and vertical rods are not required, and the wall panels are secured to the floor by passing the securing members through the hollow tubes within the foundation floor. The fibre cables can be flexible or stiff according to the use to which they are put Due to the modular nature of the buildings, the individual elements can be transported from one central location to the required site and because of the flat nature of the wall panels, the materials needed for the building can occupy a small space within the particular vehicle being used for transportation. Moreover, once the materials have reached the proposed location of the building, the building can be assembled using a relatively unskilled workforce which again assists the rapid construction of the building, particularly useful following a natural disaster.

A composite material, which is suitable for use in the construction of building is formed as follows. A bonding material, often referred to as bonding slip, is prepared by the dissolution of water glass (sodium silicate) in water, until the water glass solution has a sodium oxide content of 40% w/w. A blowing agent, sodium nitrate (6% w/w of the water glass concentration) is dissolved in the water glass solution and the solution produced thereby, heated to a temperature of 80C. The solution is maintained at 80C for a period of time in order to allow excess water to evaporate. Care must be taken that the temperature does not greatly exceed 80C as this leads to the water vapour being removed too quickly, and to decomposition of the sodium nitrate. Water is removed until the sodium silicate/sodium nitrate-containing solution has a viscosity of from 1.5-2.0 poise.

Silica powder, having an average particle size of 300µ—with 60% of the particles having a particle size of from 270-330µ—is fed onto a granulating tray. The particle size of the silica powder is important. Too high a percentage of fines requires, in subsequent steps, more filler resin and can also clog up the mixer. Too high a percentage of coarse material reduces the production of cenospheres.

The bonding slip—i.e. the above described solution of water glass and sodium nitrate—is sprayed onto the silica powder through an oscillating arm positioned above the granulating tray. When the correct amount of bonding slip has been added the glass powder begins to form an agglomerate with the bonding slip and the surface tension within the agglomerate forms it into small beads. As the bonding slip interacts with the silica powder the viscosity of the fluid gradually increases. The particles of the silica powder gradually increase in size primarily due to hydration, reaching about 400-500µ. When the viscosity of the fluid is high enough, (approximated to the viscosity of putty or plasticine) the agglomerate is extruded through holes in the granulating tray and cut into pre-blown granules.

The pre-blown granules then enter a rotating kiln heated to a temperature of 750C, the rotary action of the rotary kiln forming the pre-blown granules into spherical beads. When, due to the heating action of the rotary kiln, the beads reach a temperature of approximately 650C the sodium nitrate begins to decompose producing a gas ($NO_x$). The pressure of the gas forms the internal volume of the beads into a foam like structure, which structure is maintained upon drying the bead, forming what is often referred to as a cenosphere.

Using the above process, cenospheres of different sizes may be produced by employing different sized meshes during extrusion of the pellets. Typical values for the size of the cenospheres are 0.5 mm-8.0 mm. During the drying process, care should be taken that the temperature in the kiln does not exceed 800C, as the sodium nitrate consequently decomposes too quickly. The temperature of the kiln should also be above 700C in order that the cenospheres formed are of a satisfactory quality. As an alternative or as an additional blowing agent to sodium nitrate, soda/urea/hydrogen peroxide or soda lye/manganese IV oxide/sugar or a suitable mixture thereof can be used.

Wall and roof panels, having a composite structure and which can be used, for example, in the construction of housing are produced as follows. Cenospheres formed of an expanded silica and produced by the above process are mixed with an epoxy resin monomer bonding material. The size distribution of the silica cenospheres is a ratio from, by weight, of 3:2:1 for beads having a particle size of 2:1:~0.5 mm. The distribution of sizes enables an efficient close packing of the cenospheres, within the eventually formed panel and requires the minimal amount of resin. The close packing moreover contributes to the strength of the panel and reduces possible warping during polymerisation of the resin monomer and during use. A typical value for the weight ratio of silica cenospheres to resin is 95:5.

As the density of the beads is 0.7-0.8 $g/cm^3$ and that of the resin is far denser, often in the region of 1.1 $g/cm^3$, care must be taken that the viscosity of the resin is sufficiently high in order to slow down the rate at which the beads float to the top of the resin. When the cenospheres and the resin monomer have been thoroughly mixed together, a polymerisation catalyst, hexamine, at a level of 5-6% w/w of the resin monomer is added. Once the mixture has reached a viscosity of 30-50 poise, preferably 40 poise, the mixture is poured into a mould to cure and harden. The temperature at which the curing process takes place is ambient temperature. The mould can include a number of PVC tubes which pass through the body of eventually formed block. The tubes result in the presence of channels through the block, which channels facilitate the passage of cables used during the construction of a building.

In order to assist the maintenance of an even distribution of the cenospheres throughout the resin, the mould has vibrating means to vibrate the mixture. Typically the vibrating means are located ⅓ and ⅔ of the way along the length of the mould. A vacuum pump can be used to draw the mixture down the mould and reduce any residual air pockets. After curing, which typically requires about an hour, the hardened core material is removed from the mould.

As an alternative, or, where applicable, in combination with the polyester monomer above, a vinyl ester or an unsaturated polyester can be used. Vinyl esters are preferred as they improve the fire resistance characteristics of the material produced. The catalyst for the vinyl ester or unsaturated polyester polymerisation is methylethyl ketone peroxide (MEKP). The MEKP is normally used at a level of 2% w/w of the resin monomer. The MEKP can be absorbed onto a support such as bentonite, or other clay material. When using bentonite, the catalyst is mixed in more slowly than is normally the case in order to reduce damage to the bentonite particles. During the polymerisation process, ultrasound is used to break apart the bentonite and release the MEKP into the mixture which commences polymerisation. By absorbing the catalyst therefore, the onset of polymerisation can be delayed.

Figure 20:
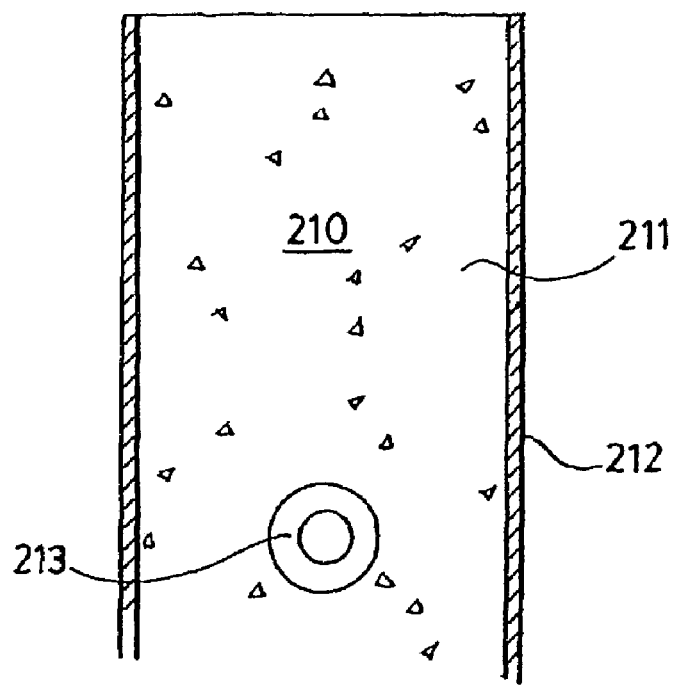
FIG. 20 is a detailed section taken through a wall panel along A-A of FIG. 9.

As shown in FIG. 20 a wall panel 210 comprises a central core 211. The central core 211 is a composite material comprising expanded glass beads bound together by a polyester resin. The wall panel 210 further comprises a skin 212, and a channel 213 along which a cable can pass. The skin is also a composite material comprising 35% v/v aluminium oxide trihydrate and approximately 65% v/v polymeric resin.

Alternatively, the core material is formed by pouring the precursor mixture of resin monomer into a forming tray. Once polymerisation has taken place, the block of core material thus formed is cut up to the appropriate size. The outer skin is then bonded to the core material using a bonding paste.

As an alternative to using the above resins, the resin may be selected from one or more of the following classes of polymeric compounds, polyurethane, polyacrylic, polyphenolic, polybromophenolic, polyvinylester or an epoxy resin.

Wall panels for use in, for example, the construction of a building are formed as follows. An inner core material, for example a composite form from resin bound glass beads is shaped in the form of a rectangular block or other desired shape. In order to improve the aesthetic, constructional and safety characteristics of the block, a skin is overlaid on one or both of the in use inner and outer surfaces of the block. The skin is often formed separately from the block and bonded subsequently to the block.

Figure 21:
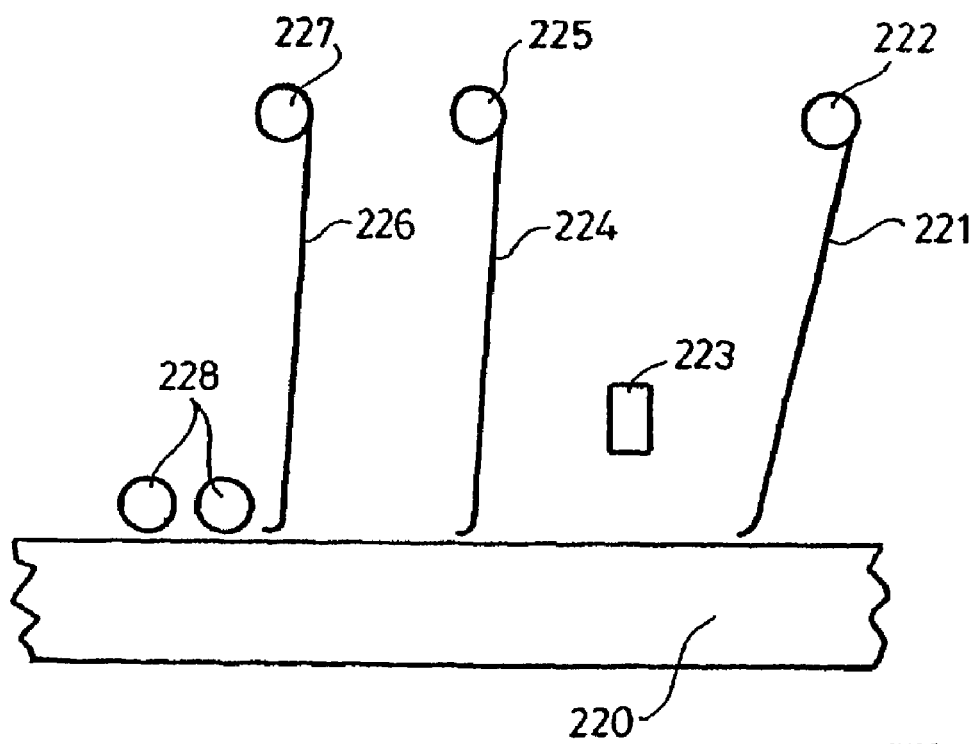
FIG. 21 is an illustration of production of a skin for a wall panel.

The skin is formed as follows, with reference to FIG. 21. A moving bed 220 of a skin forming machine, moves at approximately walking pace. A nylon sheet 221 is unfurled from a roller 222 and laid flat onto the bed 220. As the bed 220 moves, a resin dispenser 223 dispenses resin—in respect of which the nylon sheet 221 is impermeable—onto the surface of the sheet 221. A glass fibre mat 224 is unfurled from the roller 225 and overlaid over the nylon sheet 221. The glass fibre mat 224 incorporates chopped glass strands and is permeable to the applied resin. A further nylon sheet 226 is unfurled from a roller 227 and overlaid over the glass fibre mat 224 to form a layered pre-sheet. The layered pre-sheet passes through the compression rollers 228 which compress the layers together and ensure that the resin is spread out sufficiently to bond the sheets 221, 224, 226 together. Overall, the resin is present in the finished skin at a level of 15-30% w/w, although a level of 20% w/w has been found to be ideal. The sheet then passes to a curing region in which the resin is polymerised, bonding the sheets together to form a uniform structure. The skin produced thereby can be either cut into lengths or rolled up and transported or stored.

The nylon sheets 221,226 employed are between 17-21µ in thickness, although the thickness of 19µ has been found to give optimum performance. Above 19µ, the nylon sheets can distort, particularly during rolling and curing, which gives the skin a poor profile.

The method of polymerisation used depends upon the resin used to bond the sheets together, but is typically either achieved through the use of heat or by irradiation with ultraviolet radiation. The length of the curing (polymerisation) station is typically approximately 12 m, to enable the temperature and/or radiation level to be set to give the optimum polymerisation.

In addition to the layers described above, a number of the other features can also be included. A gel coat incorporating a colouring agent can be incorporated. A gel coat can be distributed over the nylon sheet 221, prior to the addition of the bonding resin from the resin dispenser 223. The colouring agent is added as part of the gel coat and can be, for example, titanium dioxide, which in the finished sheet imparts a white colour to the skin and eventually to the finished panel.

A further sheet of glass tissue (having a density of 14-30 g/m²) may also be, during the production, overlaid onto the nylon mat 121. The glass tissue minimises the risk of surface features from the individual sheets being imparted to the finally produced skin.

A fire-retardant filler can also be included in the skin, by the incorporation of a fire-retardant material into the resin dispenser 223. One example of a fire-retardant material is aluminium oxide, having a mean particle size of less than 0.25µ and ideally a mean particle size of less than 10µ. The smaller size enables the fire-retardant material to pack more efficiently. The aluminium oxide fire-retardant material is typically present at a level of 15-50% w/w of the resin. A level of 30-40% has been found to be particularly suitable, and 35% w/w especially suitable. The level should be sufficient to impart adequate fire retardant properties to the skin produced. However, above a level of 50% w/w the aluminium oxide causes the viscosity of the resin to be too high.

As an alternative, or in addition to aluminium oxide, a number of other fire retardant materials can be used. For example glass flake can be used. Chemicals, which are at least partially soluble in the resin can also be employed such as polyhalogenated phenols, for example polybromophenols.

The glass fibre mat 224 can be obtained either incorporating pre-chopped strands or with the strands in tact. In the latter case, the mat 224 ideally first undergoes a chopping process which breaks the strands into small pieces. A typical density for the glass fibre mat 224 is from 280-320 g/m². A value of approximately 300 g/m² has been found to be particularly beneficial, imparting some rigidity into the finished skin.

The finished skin can be added, by the use of a suitable resin both to a pre-formed composite block or other suitable core material. Alternatively, the skin can be incorporated into a mould in which a block has been formed, in which case the core material can bond directly to the skin during the core materials production.

The skin can also be corona treated, whereby an electric current is passed across its outer surface. A corona treatment modifies the overall structure of the outer surface and enables the surface to receive, for example, paint or varnish.

The wall panel formed by the above process is highly durable and resistant to attack by water, fire and insects such as termites common to those areas which also suffer from extreme weather conditions.

It will of course be understood that the invention is not limited to the specific details described herein, which are given by way of example only, and that various modifications and alterations are possible within the scope of the appended claims.

The invention claimed is:

1. A modular building comprising:
   a foundation floor having secured therein a plurality of anchor elements;
   a plurality of wall-retaining track elements adapted to engage wall panels of the building, the track elements being securable to the foundation floor so as to define a position of at least one of load bearing walls of the building, the wall-retaining track elements defining a U-shaped cross-section into which a wall panel is adapted to sit;
   wall panels locatable with respect to the track elements, each panel including an inner material defining at least one wall panel interior channel or interior duct wholly enclosed therein and substantially horizontal to a longitudinal axis thereof and at least one wall panel interior channel or interior duct wholly enclosed therein disposed substantially perpendicularly to and laterally of the longitudinal axis; and
   a plurality of securing members adapted to pass through and locatable within said channels or ducts, the securing members being anchored at each end thereof so as to maintain the panels in fixed relationship to one another.

2. A modular building as claimed in claim 1, in which the building further comprises a roof structure formed from a plurality of roof panels, each panel including at least one roof panel channel or duct formed therein parallel to the longitudinal axis thereof and at least one roof panel channel or duct formed therein disposed perpendicularly to and laterally of the longitudinal axis.

3. A modular building as claimed in claim 2, in which the roof panels are secured to a roof beam utilizing a plurality of securing members which are adapted to pass through and be locatable within said roof panel channels or ducts, the securing members being anchored at least end thereof so as to secure the panels in fixed relationship to one another and the roof beam.

4. A modular building as claimed in claim 2, in which the wall or roof panels comprise a composite material utilising silica cenopheres and a resin.

5. A modular building as claimed in claim 4, in which the wall or roof panels have bonded to and across at least part of a surface, a second composite material comprising a plurality of layers, including inner and outer nylon layers, a glass fibre mat layer therebetween and a polymer resin distributed between the nylon layers to bond the layers together.

6. A modular building as claimed in claim 5, in which the thickness of the nylon layers is between 17-21 μm, so that the nylon layers neither tear nor distort during construction.

7. A modular building as claimed in claim 5, in which the resin is present in an amount of 30-50% w/w of the second composite material.

8. A modular building as claimed in claim 7, in which the resin is selected from one or more of the following classes of polymeric compounds: polyester; polyurethane; polyacrylic; polyphenolic; polybromophenolic; polyvinylester; or epoxy resins, including mixtures thereof.

9. A modular building as claimed in claim 5, in which there is provided a fire retardant material.

10. A modular building as claimed in claim 9, in which the fire retardant materials is included between the nylon layers.

11. A modular building as claimed in claim 9, in which the fire retardant material is selected from aluminium trioxide, glass flakes or a retardant chemical.

12. A modular building as claimed in claim 11, in which aluminium trioxide is provided in an amount 15-50% w/w with respect to the resin.

13. A modular building as claimed in claim 5, in which the aluminium trioxide is present in an amount 30-40% w/w.

14. A modular building as claimed in claim 5, in which the second composite material includes a glass-tissue layer having a density of 14-30 g/m$^2$, to reduce uneven features being introduced to the surface thereof.

15. A modular building as claimed in claim 5, in which the second composite material includes a colouring agent such as titanium dioxide to improve its appearance.

16. A modular building as claimed in claim 1, in which the security members comprise rods or cables having high tensile strength characteristics while maintaining flexibility.

17. A modular building as claimed in claim 1, in which the securing members include a threaded sleeve element at one or both ends thereof for receiving a securing bolt.

18. A method of constructing a building including the steps of:
   preparing a ground area on which the building is to stand to receive a foundation floor;
   forming a foundation floor having secured therein a plurality of anchor elements; securing wall-retaining members to the foundation floor over said anchor elements, to define the location of load bearing walls;
   attaching elongate security members to the anchor elements;
   locating wall panels with respect to the wall-retaining members, each of the wall panels including an inner material defining at least one wall panel interior channel or interior duct wholly enclosed therein and substantially horizontal to a longitudinal axis thereof;
   securing the wall panels by threading the flexible securing members through the wall panels;
   tensioning said securing members; and
   locking the securing members to attenuate movement.

19. A modular building comprising:
   a foundation floor having secured therein a plurality of anchor elements;
   a plurality of wall-retaining track elements adapted to engage wall panels of the building, the track elements being securable to the foundation floor so as to define the position of at least the load bearing walls of the building, the wall-retaining track elements defining a U-shaped cross-section into which a wall panel is adapted to sit;
   wall panels locatable with respect to the track elements, each panel including an inner material defining at least one wall panel interior channel or interior duct wholly enclosed therein and substantially parallel to a longitudinal axis thereof; and,
   a plurality of securing members adapted to pass through and locatable within said wall panel interior channel or interior duct, the securing members being anchored at each end thereof so as to maintain the panels in fixed relationship to one another.

\* \* \* \* \*